(12) United States Patent
Widmer et al.

(10) Patent No.: US 8,434,579 B2
(45) Date of Patent: May 7, 2013

(54) AIR SEPARATOR AND AIR SEPARATOR WITH DUCTING FOR MAXIMUM COOLING AND FUEL ECONOMY

(75) Inventors: Jason A. Widmer, Marysville, OH (US); Jeremy P. Lucas, Delaware, OH (US); Christopher D. Meeks, Greensboro, NC (US); Michael W. Maurer, Dublin, OH (US); Michael R. Missig, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/168,319

(22) Filed: Jun. 24, 2011

(65) Prior Publication Data

US 2012/0325324 A1    Dec. 27, 2012

(51) Int. Cl.
*B60K 11/00*    (2006.01)

(52) U.S. Cl.
USPC ........................................... 180/68.1

(58) Field of Classification Search ............. 180/68.1, 180/68.2, 68.4, 68.6; 296/187.01, 187.09, 296/193.01
See application file for complete search history.

(56) References Cited

U.S. PATENT DOCUMENTS

| | | | |
|---|---|---|---|
| 3,933,136 A | 1/1976 | Burst | |
| 4,566,407 A | 1/1986 | Peter | |
| 4,938,303 A | 7/1990 | Schaal et al. | |
| 4,976,489 A | 12/1990 | Lovelace | |
| 7,080,704 B1 | 7/2006 | Kerner et al. | |
| 7,296,645 B1 | 11/2007 | Kerner et al. | |
| 7,484,584 B1 | 2/2009 | Kerner et al. | |
| 7,766,111 B2 | 8/2010 | Guilfoyle et al. | |
| 7,784,576 B2 | 8/2010 | Guilfoyle et al. | |
| 8,091,668 B2 * | 1/2012 | Amano et al. | 180/68.1 |
| 2006/0102109 A1 | 5/2006 | Becker et al. | |
| 2008/0185125 A1 * | 8/2008 | Prior | 165/86 |
| 2010/0147611 A1 | 6/2010 | Amano et al. | |

FOREIGN PATENT DOCUMENTS

| | | |
|---|---|---|
| JP | 2002-225573 A | 8/2002 |
| JP | 2008-068688 A | 3/2008 |
| JP | 2010-173357 A | 8/2010 |
| JP | 2010 214998 | 9/2010 |

OTHER PUBLICATIONS

PCT/US2012/041615 International Search Report and Written Opinion, mailed Jan. 29, 2013.

* cited by examiner

*Primary Examiner* — John Walters
*Assistant Examiner* — James Triggs
(74) *Attorney, Agent, or Firm* — Fay Sharpe LLP

(57) ABSTRACT

An assembly is provided for maximizing cooling and fuel economy. A grille opening in the vehicle allows air to flow toward the engine compartment along a first path and a bottom breather opening allows air to flow toward the engine compartment along a distinct, second path. An air separator extends between the first and second paths to prevent mixing of airflow along these paths. The air separator may be a thin dividing wall of a deformable material that extends toward a condenser/radiator assembly at low vehicle speeds. At increased vehicle speeds, the deformable portion deflects to enhance airflow along the second path. An associated method of controlling airflow includes terminating the air separator closely adjacent a condenser/radiator assembly to limit mixing of airflow along separate paths, and deflecting in response to increased air flow to alter airflow through at least one of the first and second paths.

20 Claims, 5 Drawing Sheets

AIR SEPARATOR AND AIR SEPARATOR WITH DUCTING FOR MAXIMUM COOLING AND FUEL ECONOMY

BACKGROUND

This disclosure relates to air flow through an automotive vehicle, and more particularly to an air separator for maximum cooling and fuel economy. Selected aspects of the disclosure may be used in related applications and environments.

In recent years, improved aerodynamics have been sought in order to improve drag and fuel economy of an automotive vehicle. As part of the improved aerodynamics, less air is allowed to enter the vehicle. Less air into the vehicle reduces the drag. In turn, reduced drag improves fuel economy.

On the other hand, limiting the amount of open area on the vehicle results in other issues coming to the forefront. For example, limiting the amount of air entering the vehicle increases the overall operating temperature of the vehicle or at least the operating temperature of select portions of the vehicle. Generally speaking, automotive vehicles have been getting hotter with each improvement or development directed to improved aerodynamics. Limiting the overall amount of airflow into the vehicle also places a greater premium on efficiently using the incoming air for cooling purposes.

There are also issues associated with plural airflow paths meeting within the vehicle. For example, separate airflow paths mixing behind the grill and fascia reduces the overall efficiency of airflow through the vehicle. The airflows tend to compete with one another at a juncture between the airflow paths, and thereby reduce the overall efficiency of air passing through the radiator, for example. This is especially true for a bottom-breather vehicle.

In addition to the noted functional considerations, styling and aerodynamics are also directed to a clean, sleek look that unfortunately means less open area to thereby reduce drag. Consequently, although aerodynamics improves, the sleek styling arrangement has a negative impact on the engine cooling and intake air temperature.

A need still exists, however, for directing air through the automotive vehicle, and particularly to the condenser and radiator. It is also difficult to mount ductwork to or adjacent the radiator or fascia, and thus assembly would be improved if the ductwork could be mounted elsewhere.

Therefore, a need exists for increasing the efficiency and utilization of air entering the vehicle. In this manner, improved fuel economy and improved aerodynamics will still be achieved, while limiting issues with regard to cooling.

SUMMARY

An assembly for maximizing at least one of cooling and fuel economy in an automotive vehicle having an engine compartment is provided. A grille opening in the vehicle allows air to flow toward the engine compartment along a first path. A front fascia extends below the grill opening on the vehicle and has a bottom opening allowing air to flow toward the engine compartment along a second path. An air separator extends between the first and second paths to prevent mixing of air flows along the first and second paths.

A method of controlling airflow through an engine compartment of an automotive vehicle includes providing a grille opening and an opening along a bottom surface of vehicle adjacent the lower front fascia. Positioning an air flow separator behind the grille between the bumper beam and the condenser/radiator divides and prevents mixing of airflow along first and second paths through the engine compartment.

DETAILED DESCRIPTION OF THE PREFERRED EMBODIMENTS

Figure 1:
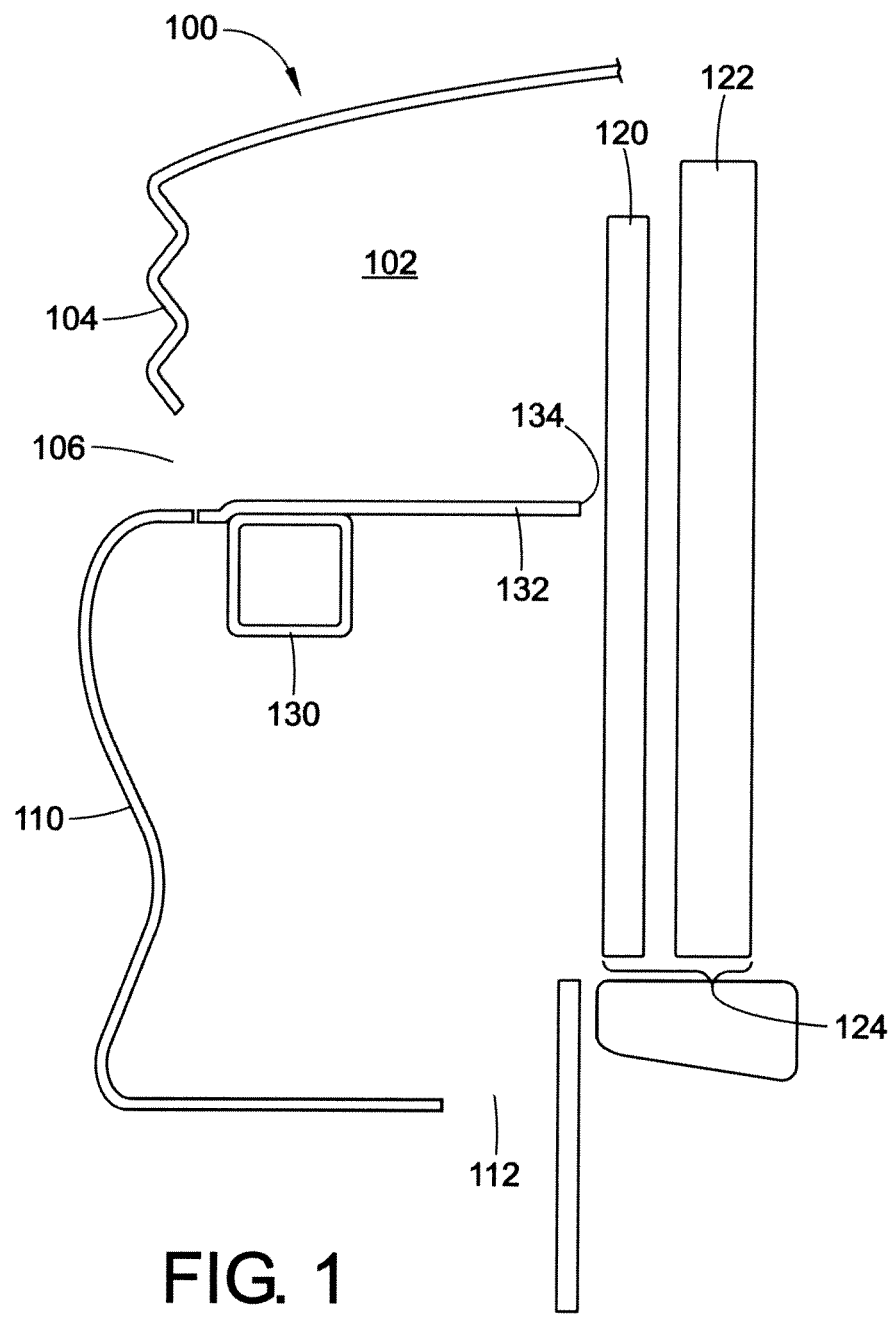
FIG. 1 is a schematic, cross-sectional representation of a front end of an automotive vehicle employing a preferred embodiment of the present disclosure.

Turning first to FIG. 1, there is shown a portion of an automotive vehicle 100 that includes an engine compartment 102. A number of components typically found in the engine compartment 102 have been removed from this view for ease of illustration and to facilitate and understanding of the present disclosure. Along an upper, front edge of the automotive vehicle 100 is provided a grille 104 that includes openings 106 allowing airflow from external of the automotive vehicle to the engine compartment 102.

Below the grille 104, and typically extending along a lower portion of the front of the vehicle 100, is a front fascia 110. The fascia 110 is shown here as having no openings along the front surface, and rather a bottom opening 112 is provided adjacent the fascia to receive air from underneath the vehicle 100. The bottom opening 112 is configured and shaped to direct airflow into the engine compartment 102.

Included among some of the automotive components housed within the engine compartment are a condenser 120 and radiator 122, sometimes collectively referred to herein as a condenser/radiator assembly 124. It will be appreciated that the condenser 120 is useful in connection with the air conditioning of the automotive vehicle while the radiator provides for a desired heat exchange for cooling the engine. The condenser 120 and radiator 122 are typically positioned closely adjacent one another and usually the assembly 124 is located toward a front end of the engine compartment 102 of the automotive vehicle.

As noted above, it is important to efficiently use the airflow passing through the engine compartment in a manner that is carefully controlled upon reaching the condenser and radiator. This includes maximizing airflow and desired heat exchange. Airflow through the grille openings 106 extends along a first, upper path toward the condenser/radiator assembly 124. Likewise, a second, lower path of airflow through the engine compartment proceeds through the bottom opening 112 into a lower portion of the engine compartment 102 where the second path directs airflow to the condenser/radiator assembly 124. With reduced opening areas, a slight increase in engine compartment temperatures is experienced because less airflow is available through the radiator for cooling purposes. On the one hand, there is a desire to improve aerodynamic efficiency and likewise fuel economy, and thus the need exists to use air entering the vehicle more efficiently. One manner of accomplishing this is to segregate or separate the first, upper airflow path and the second, lower airflow path through the engine compartment. As a part of this solution, a bumper beam 130 is preferably located directly behind the grille. Positioning the bumper beam in this location assists in separating the first path (grille airflow), from the second path (bottom breather airflow).

In addition, a thin, dividing wall or air separator 132 is preferably attached to the bumper beam 130. In the illustrated embodiment, the air separator 132 is advantageously attached or secured to a top portion of the bumper beam 130 and at least a portion of the air separator extends rearwardly in a generally horizontal orientation toward the condenser/radiator assembly 124. A free end 134 of the air separator 132 terminates in closely spaced relation with the condenser/radiator assembly 124, and is shown here as terminating in substantially perpendicular relation to the condenser 120, although other orientations could be used without departing from the scope and intent of the present disclosure. Use of the bumper beam 130 and air separator 132 segregates the engine compartment 102 into generally upper and lower regions so that the first path of the airflow through the grille openings 106 enters the engine compartment and proceeds through an upper portion of the condenser/radiator assembly without significant mixing with airflow that proceeds along the second path through the bottom opening 112 and along the lower portion of the condenser/radiator assembly. Preliminary simulation testing suggests that a substantial increase in airflow would result, on the order of approximately 2½% increased airflow. This, of course, suggests that improved fuel economy can be achieved by using the desired aerodynamic styling that results in a reduced total amount of airflow into the engine compartment while still maintaining the desired cooling because of the increase in airflow resulting from segregating the first and second paths. The airflow that enters the engine compartment 102 from one location no longer competes or interferes with airflow from another location. As a result, prior arrangements where the airflows intermixed resulted in less efficient airflow and this negative impact has been eliminated.

Figure 2:
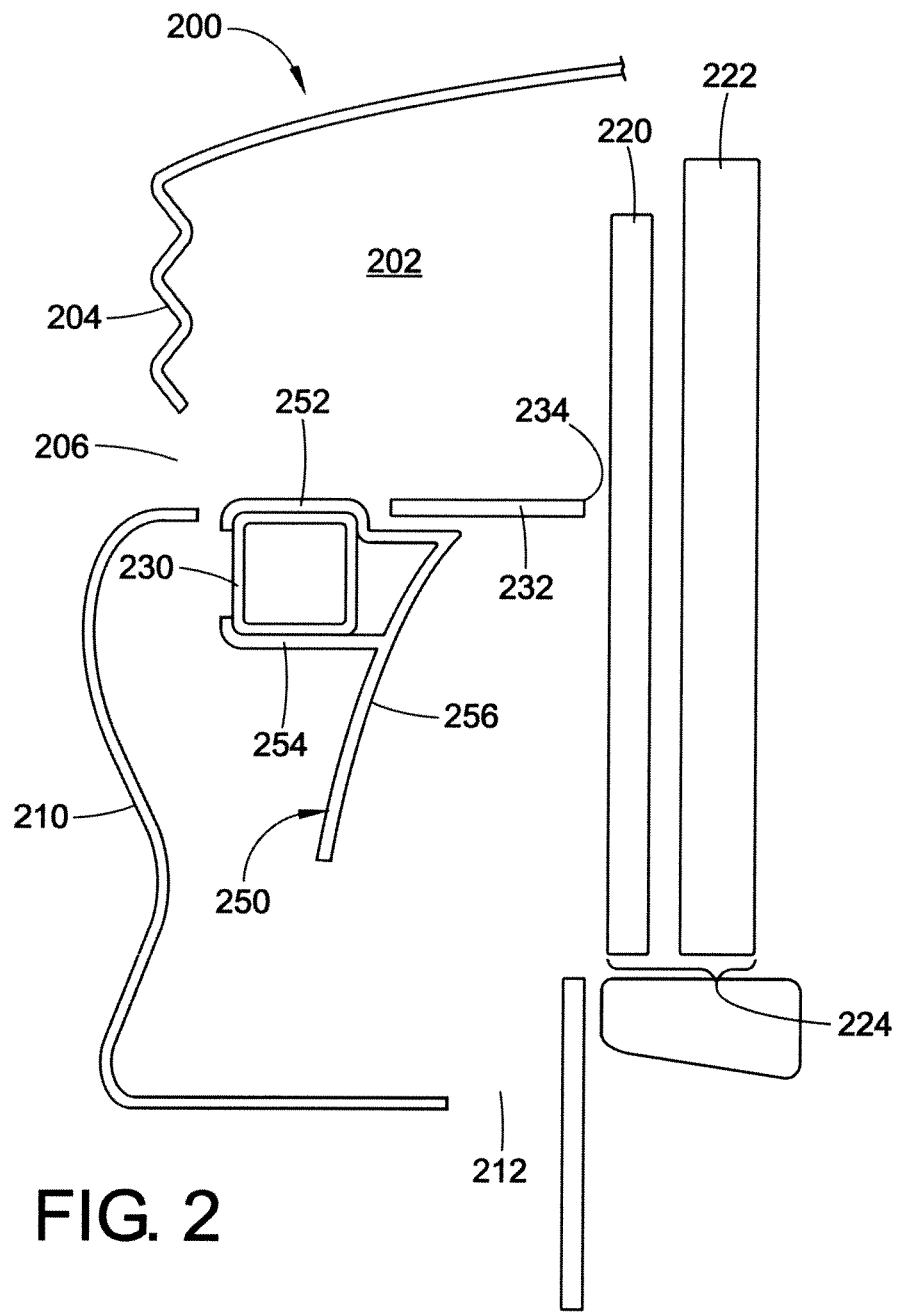
FIG. 2 shows a view of the front end of an automotive vehicle similar to FIG. 1 with another preferred embodiment of the present disclosure.
Figure 3:
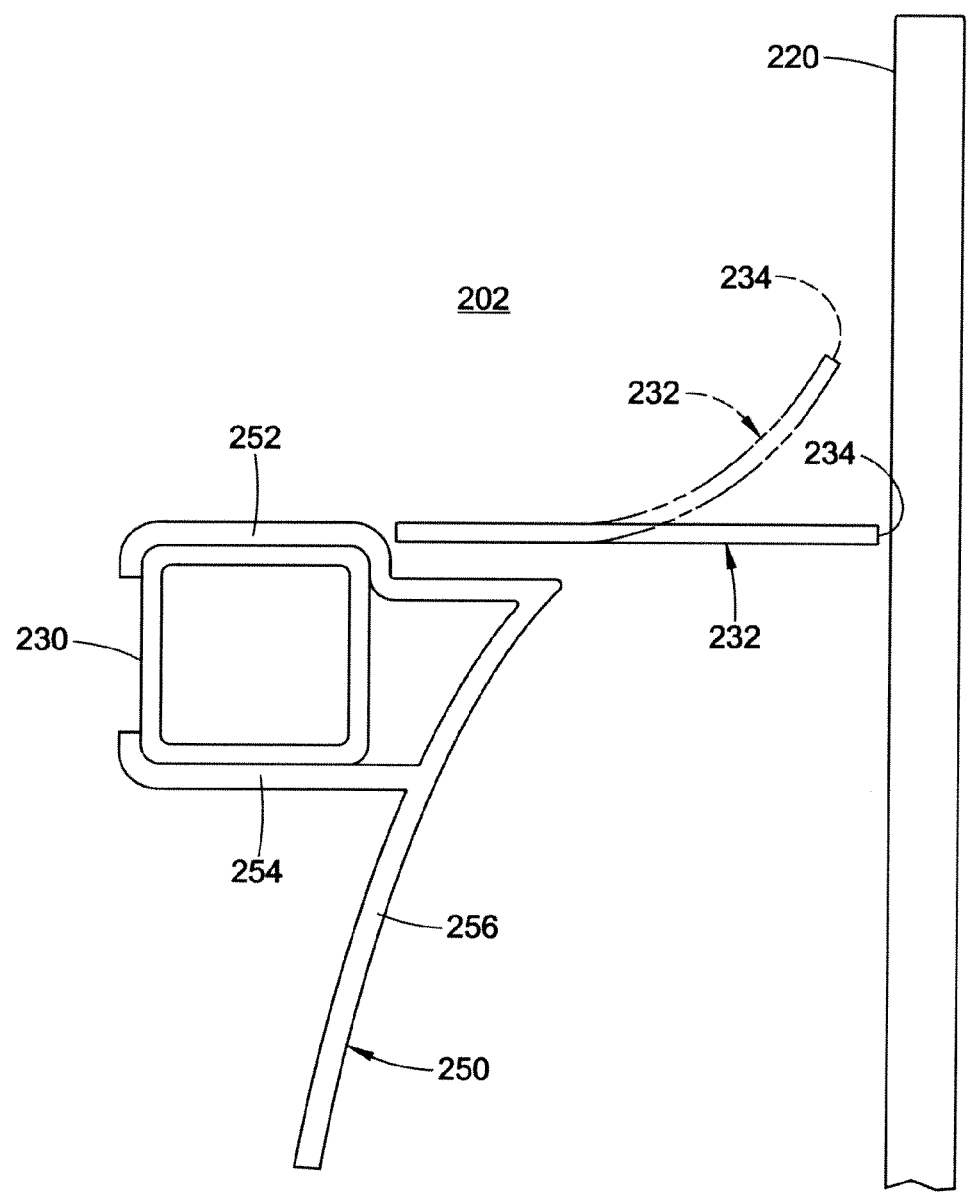
FIG. 3 is an enlarged schematic, cross-sectional representation of portions of the preferred embodiment of FIG. 2.

A second preferred embodiment of the present air separator disclosure is more particularly illustrated in FIGS. 2 and 3. For ease of reference and understanding, like components identified in the "100" series of the FIG. 1 embodiment will be identified by like reference numerals in the "200" series in the embodiment of FIGS. 2 and 3. For example, automotive vehicle 100 in FIG. 1 is now referenced as automotive vehicle 200 in FIGS. 2-3. Bumper beam 230 preferably supports the air separator 232 that extends generally rearwardly toward the condenser/radiator assembly 224. The air separator 232 in this embodiment is preferably at least partially constructed of a foam material or similar deformable material that serves multiple functions. First, and as best appreciated from comparing FIGS. 2 and 3, at low vehicle speed, the air separator 232 maintains its natural unbiased position shown as extending generally horizontally toward the condenser 220. In other words, terminal end 234 of the foam material is closely spaced to the condenser 220 and serves as an effective dividing wall between the first, upper airflow path and a second, lower airflow path provided by the bottom opening 212. As vehicle speed increases, and a greater amount of airflow is provided through the bottom opening 212, at least a portion of the foam deforms or bends to adopt the dotted line conformation shown in FIG. 3. Specifically, the region of the foam that extends from adjacent the condenser toward the bumper beam 230 is exposed to increased air pressure as a result of the higher vehicle speed. The increased air pressure over the lower surface area of the air separator 232 results in an increased force that overcomes the natural, at-rest position of the foam material and urges the air separator to bend upwardly as illustrated in FIG. 3.

In addition, ductwork or ducting 250 is also preferably mounted to the bumper beam 230. By way of example only, the ducting 250 includes a first mounting portion 252 configured for receipt over an upper portion of the bumper beam 230 and a second mounting portion 254 is configured for mounting receipt over a lower surface of the bumper beam. Of course, alternative configurations of mounting to the bumper beam may be employed without departing from the scope and intent of the present application. The ducting includes an aerodynamic generally curvilinear or arcuate contour surface 256 that is positioned by the mounting portions 252, 254 to direct airflow through the bottom opening 212 toward the condenser/radiator assembly 224 and away from a dead-end region behind the front fascia 210. The profile of the contour surface 256 smoothly redirects the airflow toward the condenser and radiator without creating undue turbulence. Further, the dotted line position of the foam representing the air separator when exposed to increased vehicle speed is illustrated in FIG. 3 and is preferably an extension of the curvilinear contour surface 256. As a result of deflecting to the dotted line position shown in FIG. 3, increased airflow along the second path is achieved. Likewise, the airflow along the first, upper flow path is reduced.

Clipping or mounting the ducting 250 to the bumper beam 230 allows the duct work to be easily assembled separate and apart from the radiator/condenser assembly. This mounting design reduces manufacturing issues associated with prior arrangements. As result, this modified design of FIGS. 2-3 use both an air separator 232 and ducting 250 to maximize the efficient use of air entering the vehicle.

Another benefit to forming the air separator from an easily deformed material such as foam relates to low-speed crash requirements. That is, in a low-speed crash event, the front end of the vehicle is designed to collapse rearwardly in a controlled fashion toward the condenser/radiator assembly 224. As noted from the above description, it is desired that the air separator be disposed close to and terminate adjacent the condenser 220 in order to segregate the airflow between the first and second paths. As a result, the air separator 232, even in a low-speed crash event, is likely to contact the condenser/radiator assembly. However, by forming the air separator 232 from an easily deformable material such as foam, allows the foam to compress without resulting in damage to the condenser/radiator assembly 224 during a low-speed crash event. It will be appreciated that the ducting 250 that improves airflow from the bottom breather opening 212 may be formed of a different material, e.g., plastic, and is intended to be spaced a greater dimension from the front surface of the condenser/radiator assembly 224. As a result, other energy dissipating features of the automotive vehicle will limit rearward movement of the bumper beam 230 and associated ducting 250 mounted thereto and prevent undesired contact with the condenser/radiator assembly 224 in a low speed crash event. Consequently, this arrangement advantageously reduces customer repair costs when compared to a similar low-speed crash event that uses prior art arrangements.

Using a foam component as an air guide or air separator allows the manufacturer to closely position the air separator 232 to the condenser/radiator assembly 224. This allows the bottom breather opening 212 to operate more efficiently, deform at higher speeds, and create a true duct shape in conjunction with duct 250. The structural arrangement also specifically addresses issues associated with a bottom breather vehicle where air enters through both the grill and from underneath the fascia. Typically when these airflows meet, the two airflows tend to fight each other and thereby reduce the overall efficiency of airflow entering and passing through the radiator. By segregating these airflows or air paths, increased efficiency of air entering the vehicle is achieved while simultaneously attaining continued improvement in fuel economy and aerodynamics.

Figure 4:
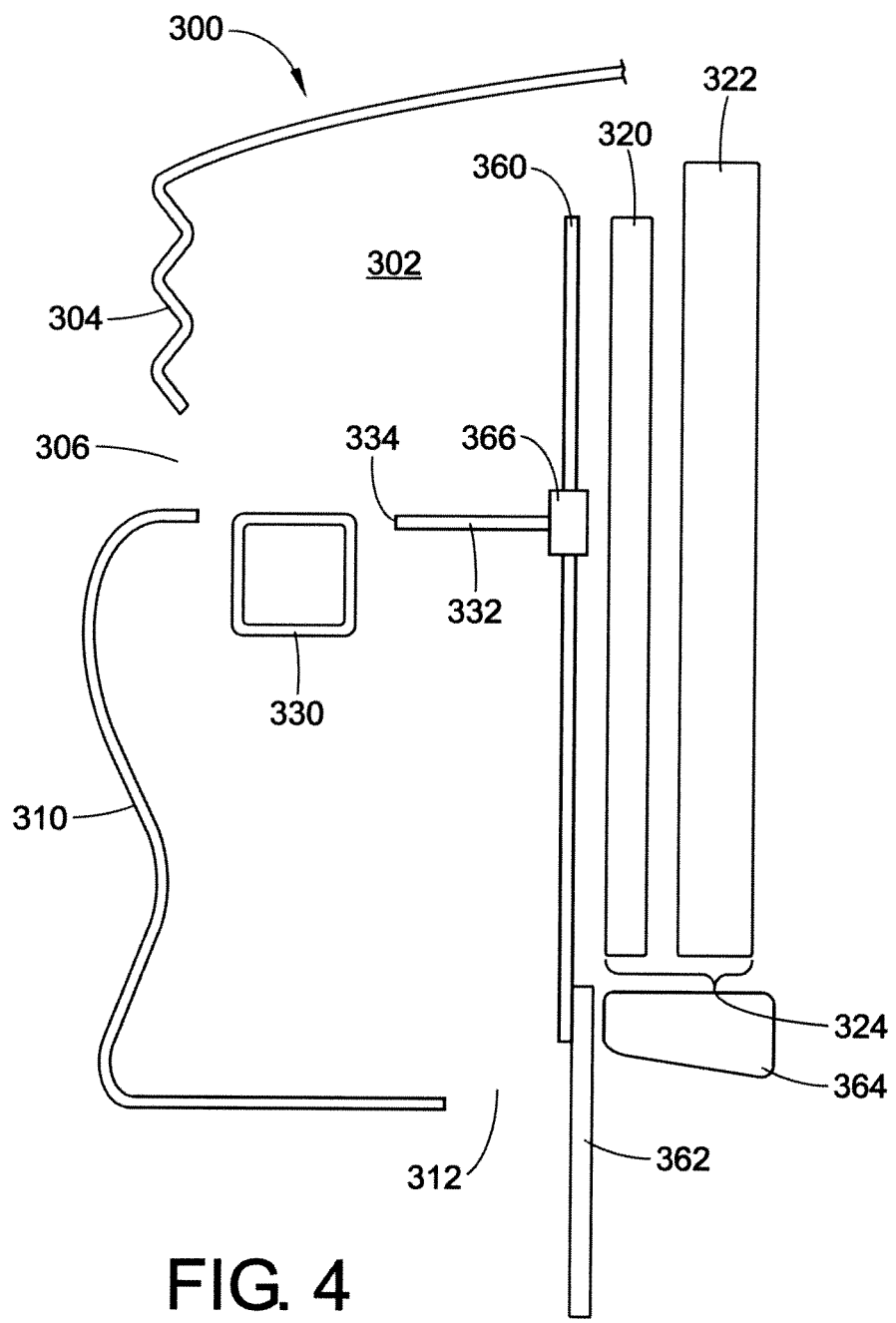
FIG. 4 is a schematic, cross-section sectional representation of a front end of an automotive vehicle employing another preferred embodiment of the present disclosure.
Figure 5:
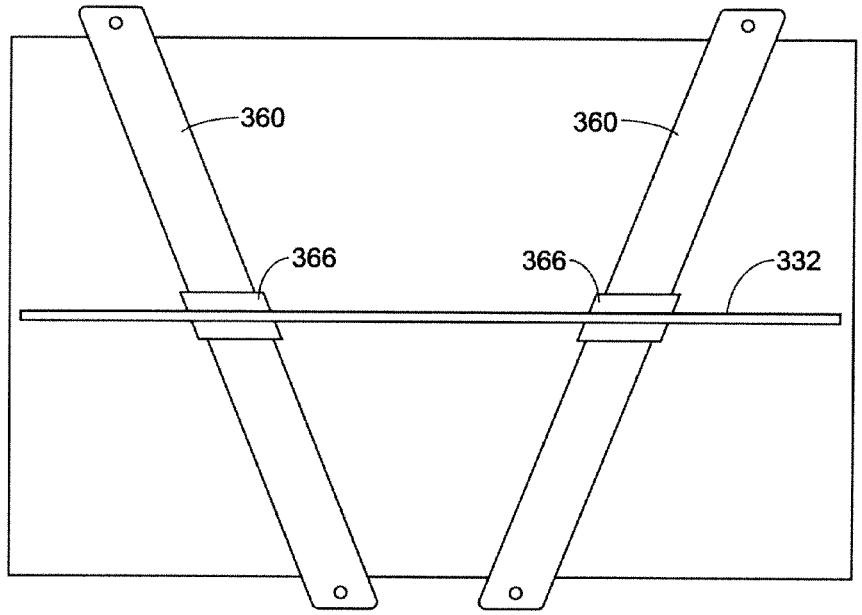
FIG. 5 is a front view of the embodiment of FIG. 4.

Turning to FIGS. 4 and 5, another preferred embodiment or alternative mounting arrangement for the air separator is illustrated. For consistency and ease of reference, like components will be referenced by like numerals, while new features will be described by new reference numerals. The automotive vehicle 300 has an engine compartment 302 disposed adjacent a front end of the vehicle. The engine compartment 302 is partially enclosed by grille 304 that includes an opening or openings 306, and a front fascia 310 that includes a bottom opening 312 that communicates with the engine compartment. Extending across at least a portion of the engine compartment 302 are one or more braces 360 that are added to stiffen the vehicle body structure. That is, the braces serve an entirely different function in the vehicle but can be advantageously used for supporting/mounting of the air separator 332. In the illustrated arrangement, the braces 360 are located adjacent the condenser 320 of the condenser/radiator assembly 324. The braces are generally aligned with air dam 362 that extends from a lower bulkhead 364 that is disposed rearwardly of the bottom opening 312 for directing airflow into the engine compartment 302. The air separator 332 has a sleeve portion 366 for receipt around the braces 360. The dividing wall 332 extends outwardly from the sleeve portion between the braces or condenser and the bumper beam to segregate the upper, first air flow path from the lower, second air flow path. The dividing wall 332 in this embodiment has a free end 334 that is disposed adjacent the bumper beam 330. Again, and for the same reasons as noted above, preferably at least the dividing wall 332 of the air separator is formed of a flexible material, that is a material that bends or deflects in response to forces associated with air flow through the engine compartment as vehicle speed increases, or that can deflect or deform in a vehicle crash event in order to limit potential damage to surrounding vehicle components.

In this embodiment, the braces 360 are mounted in the engine compartment adjacent the condenser. The braces are shown in FIG. 5 as angling from top to bottom relative to one another, although this configuration of the braces can be altered and is not deemed to be limiting. The sleeves 366 are received about a desired location of the braces 360 so that the dividing wall 332 extends toward the bumper beam 330. As described with respect to the earlier embodiments, the dividing wall 332 flexes in response to increased vehicle speed as a greater amount of air flows through the bottom opening 312. The increased air flow at increased vehicle speed may be aided in part by the air dam 362. Deflection of the dividing wall 332 varies the amount of air flow through the first, upper air flow path that proceeds through the upper portion of the condenser/radiator assembly relative to the amount of air flow along a second path from the bottom opening 312 that proceeds through the lower portions of the condenser and radiator.

Figure 6:
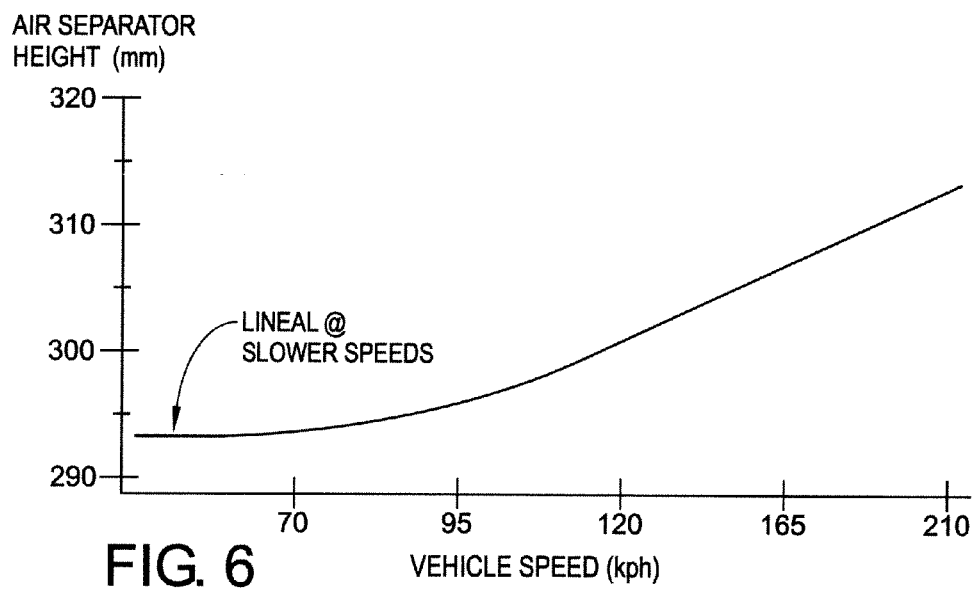
FIG. 6 is a graphical representation of movement of the air separator relative to vehicle speed.

Turning next to FIG. 6, there is shown a representative graph plotting height of the air separator, i.e., deflection from its generally horizontal position shown in solid line in FIG. 3 toward the dotted line representation in FIG. 3 at increased vehicle speed, relative to vehicle speed. Thus, the x-axis is representative of increasing vehicle speed (in kph) while the y-axis is representative of the air separator height (in mm). This height generally refers to the location of the terminal end 234 of the air separator along the height of the condenser/radiator as measured from the bottom edge of the radiator. That is, and as evident in FIG. 3, the air separator has a lower height (about 292 mm) at a stationary or low vehicle speed (about 70 kph) and is deflected upwardly to an increased height (about 312 mm) at an increased vehicle speed (about 210 kph) as more airflow is provided from the bottom breather or opening 212. The slope of the curve may also vary from that shown in the graphical illustration. The bottom breather has a higher rate of contribution and becomes more effective at higher speeds. Therefore, airflow from the bottom breather opening 212 is exposed to a greater portion of the radiator surface area with increasing speeds. This provides more uniform velocity across the radiator surface. One skilled in the art will understand that these values are representative only and that "low vehicle speed" can be other speeds, likewise "high vehicle speed" can be another value, slope may vary, and that the amount of deflection may likewise vary depending on the particular vehicle and airflow requirements.

It is also contemplated that the sleeve portions of the air separators that surround the braces may be formed of a more rigid plastic to provide a secure, durable mounting arrangement. Alternatively, the entire air separator may be formed of a soft rubber, for example, and the thickness of the air separator will be designed to deflect or deform in response to airflow through the engine compartment.

One skilled in the art will appreciate that alternative structural arrangements to achieve one or more of the advantages associated with the preferred embodiments may also be employed. The above-described structures provide for a method of controlling airflow through an automotive vehicle, and more particularly through an engine compartment of the vehicle. The method includes providing a first grille opening and a second or bottom opening adjacent a lower, front fascia. The method includes positioning the air separator extending between the bumper beam and the condenser/radiator assembly so that airflow is divided along first and second paths through the engine compartment. The method further includes providing an air separator preferably extending from the bumper beam and terminating closely adjacent a condenser/radiator assembly that can selectively deflect in response to increased vehicle sped. The air separator limits mixing of airflow along the first and second paths.

At least a portion of the air separator is formed from a deformable material that selectively deflects in response to the increased airflow. Consequently, the method includes altering airflow through at least one of the first and second paths in response to increased vehicle speed, and in the present arrangement accomplishes the altering step by selectively deflecting the air separator in response to increased vehicle speed.

Still another aspect of the method includes forming the air separator from a deformable material that collapses upon impact with the condenser radiator assembly in a crash event. Using the deformable material allows the air separator to be located closely adjacent the condenser/radiator assembly and still reduces associated repair costs in the event of a low speed crash event.

A primary benefit of the described embodiments relates to improved, maximum cooling in the automotive vehicle. Improved fuel economy and aerodynamic features of the automotive vehicle are also attained. Yet another beneficial feature of this disclosure is the ability to easily assemble or mount the ducting and air separator in the engine compartment such as mounting to support braces, the bumper beam, etc. Airflow can be advantageously altered through at least one of the first and second flow paths in response to increasing vehicle speeds. If a low-speed crash event occurs, repair costs will likely be reduced by employing the deformable air separator. Still other benefits and advantages will become apparent to those skilled in the art upon reading and understanding the detailed description.

The disclosure has been described with reference to the preferred embodiments. Modifications and alterations will occur to others upon reading and understanding this specification. The present disclosure is intended to include all such modifications and alterations insofar as they come within the scope of the appended claims or the equivalents thereof.

We claim:

1. An assembly for maximizing at least one of cooling and fuel economy in an automotive vehicle having an engine compartment, the assembly comprising:
   a grille opening on the vehicle allowing air to flow toward the engine compartment along a first path;
   a front fascia extending below the grill opening on the vehicle having a bottom opening allowing air to flow toward the engine compartment along a second path; and
   an air separator extending between the first and second paths to prevent mixing of air flows along the first and second paths, wherein the air separator includes a deformable portion that changes conformation in response to increased vehicle speed.

2. The assembly of claim 1 wherein the air separator includes a thin divider wall extending from a mounting structure segregating upper and lower air flow paths through the engine compartment.

3. The assembly of claim 2 wherein the air separator extends from adjacent a bumper beam at a first end and terminates at a second end adjacent a condenser/radiator assembly.

4. The assembly of claim 3 further comprising ducting extending along a curved contour that extends downwardly toward an undersurface of the vehicle for ducting the air flow along the second flow path.

5. The assembly of claim 1 wherein the deformable portion extends from adjacent a condenser/radiator assembly at low vehicle speeds.

6. The assembly of claim 5 wherein the deformable portion extends substantially perpendicular to a forwardly facing surface of the condenser/radiator assembly at low vehicle speeds.

7. The assembly of claim 6 wherein the deformable portion decreases air flow along the first flow path at increased vehicle speeds.

8. The assembly of claim 1 wherein the deformable portion generally adopts a continuation of a contour of the curved portion at increased vehicle speeds.

9. An assembly for directing air flow through an engine compartment of an automotive vehicle, the assembly comprising:
   a grille opening on the vehicle allowing air to flow toward the engine compartment along a first path;
   a front fascia extending below the grille opening on the vehicle having a bottom opening allowing air to flow toward the engine compartment along a second path; and
   an air separator extending between the first and second paths to prevent mixing of air flows along the first and second paths, the air separator being configured to selectively increase and decrease air flow to one of the first and second paths in response to vehicle speed, wherein at least a first portion of the air separator is made of a deformable material that alters its contour in response to increased vehicle speed.

10. The assembly of claim 9 wherein the air separator first portion is made of compressible foam.

11. The assembly of claim 10 wherein a remainder of the air separator is made of a more rigid material than the first portion.

12. The assembly of claim 9 wherein a second portion of the air separator includes a curved duct surface providing a smooth flow contoured surface.

13. The assembly of claim 9 wherein the deformable material is less rigid than a condenser/radiator assembly.

14. The assembly of claim 13 wherein the air separator first portion extends between the condenser/radiator assembly at one end and a bumper beam at another end.

15. A method of controlling air flow through an engine compartment of an automotive vehicle comprising:
   providing a grille opening and an opening along a bottom of a lower, front fascia; and
   dividing air flow along first and second paths toward the engine compartment with a deformable air separator; and
   forming at least a portion of the air separator from a deformable material that selectively deflects in response to increased air flow/vehicle speed to alter air flow through at least one of the first and second paths.

16. The method of claim 15 wherein the air separator extending between the bumper beam and a condenser/radiator assembly limits mixing of air flow along the first and second paths.

17. A method of controlling air flow through an engine compartment of an automotive vehicle comprising:
   providing a grille opening and an opening along a bottom of a lower, front fascia; and
   dividing air flow along first and second paths toward the engine compartment with a deformable air separator; and
   forming at least that portion of the air separator that terminates adjacent the condenser/radiator assembly from a deformable material that collapses upon impact with the condenser/radiator assembly in response to a crash event.

18. The assembly of claim 1 wherein the deformable portion of the air separator is configured so that airflow along the first path is reduced as airflow along the second path is increased.

19. The assembly of claim 1 wherein the deformable portion of the air separator is configured to collapse upon impact with a condenser/radiator assembly in response to a crash event.

20. The assembly of claim 9 wherein the deformable portion of the air separator is configured so that airflow along the first path is reduced as airflow along the second path is increased.

* * * * *